United States Patent [19]
Garuglieri

[11] Patent Number: 5,570,641
[45] Date of Patent: Nov. 5, 1996

[54] PIVOTING TABLE WITH POWER TOOL

[75] Inventor: Andrea Garuglieri, Colle Brianza, Italy

[73] Assignee: Black & Decker Inc., Newark, Del.

[21] Appl. No.: 508,912

[22] Filed: Jul. 28, 1995

Related U.S. Application Data

[63] Continuation of Ser. No. 341,852, Nov. 18, 1994, abandoned, which is a continuation of Ser. No. 111,691, Aug. 25, 1993, abandoned.

[30] Foreign Application Priority Data

Aug. 28, 1992 [GB] United Kingdom .................... 9218388

[51] Int. Cl.⁶ .................................................. A47B 85/00
[52] U.S. Cl. ........................................ 108/13; 269/289 R
[58] Field of Search ............................... 108/13, 11, 12; 312/24, 208.5, 23; 269/289 R, 293, 71; 144/286 R

[56] References Cited

U.S. PATENT DOCUMENTS

| 139,805 | 6/1873 | Morrison ............................. 108/13 X |
| 1,645,769 | 10/1927 | Murray ..................................... 108/9 |
| 2,816,807 | 12/1957 | Bono ................................ 312/208.5 X |
| 2,899,772 | 8/1959 | Paulsen et al. ...................... 108/9 X |
| 3,069,154 | 12/1962 | Zwick . | |
| 3,570,564 | 3/1971 | Bergler . | |
| 4,465,114 | 8/1984 | Schumacher . | |

FOREIGN PATENT DOCUMENTS

| 1117359 | 5/1962 | Germany . |
| 1628992 | 11/1971 | Germany . |
| 3606524 | 4/1987 | Germany . |
| 0401922 | 12/1991 | Germany . |
| 174594 | 4/1935 | Switzerland ............................ 108/13 |

*Primary Examiner*—Jose V. Chen
*Attorney, Agent, or Firm*—Charles E. Yocum; Dennis A. Dearing; Frederick H. Voss

[57] ABSTRACT

A table (16) is pivotable about an axis (41) with respect to a frame (14) between two working dispositions. A power tool working assembly (20) may be mounted on the table. A working head (eg blade 32) of the assembly (20) is positionable through an aperture in the table so that it can work on workpieces supported above either side of the table.

The table is connected to the frame through an intermediate member (46) which is pivoted to the frame. The table has a first wheel (40) fixed thereto and a belt passes around the first wheel and around a second wheel (50) fixed to the frame (14) around the pivot (51) of the intermediate member. Pivoting of the intermediate member relative to the frame rolls the first wheel inside the belt and rotates the table between bench mode (FIG. 2) and snip-off mode (FIG. 3).

12 Claims, 5 Drawing Sheets

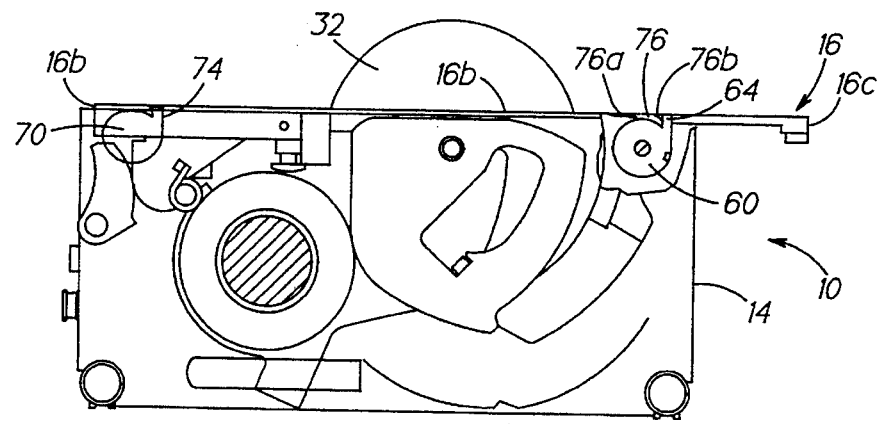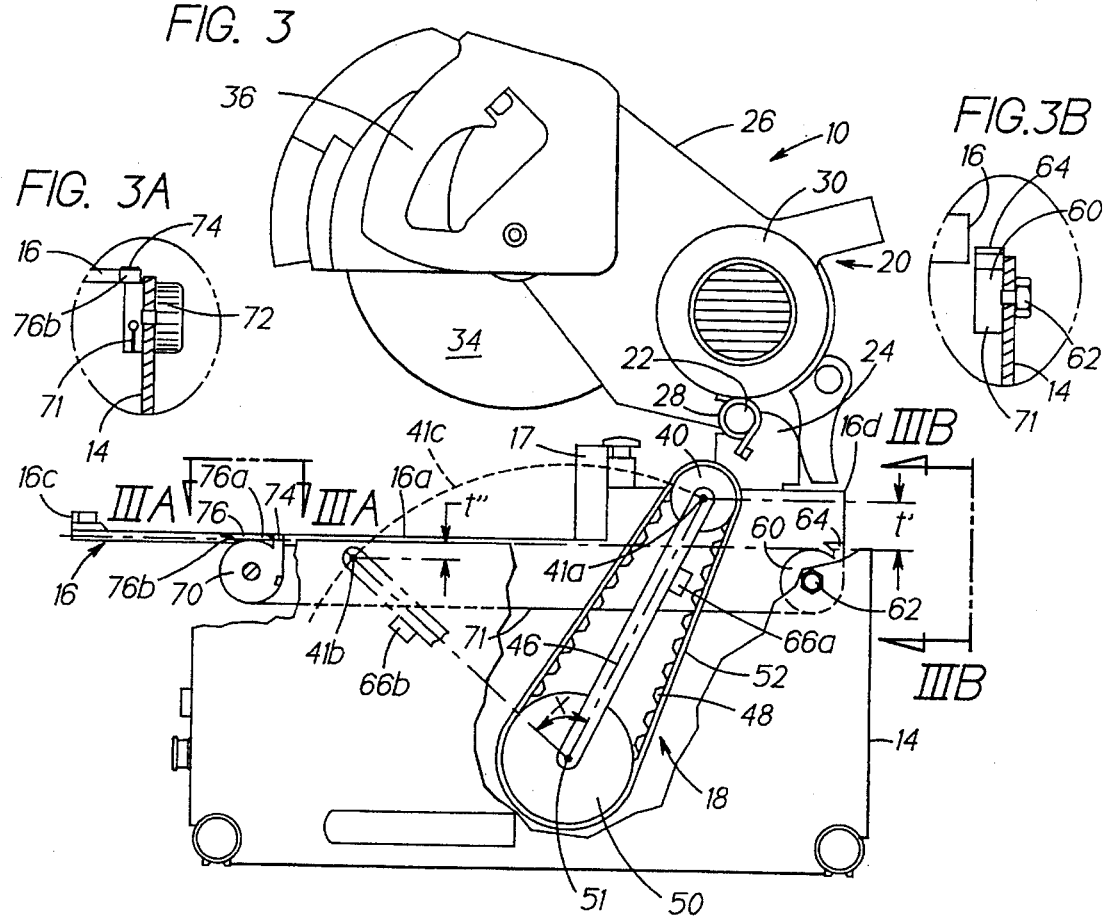

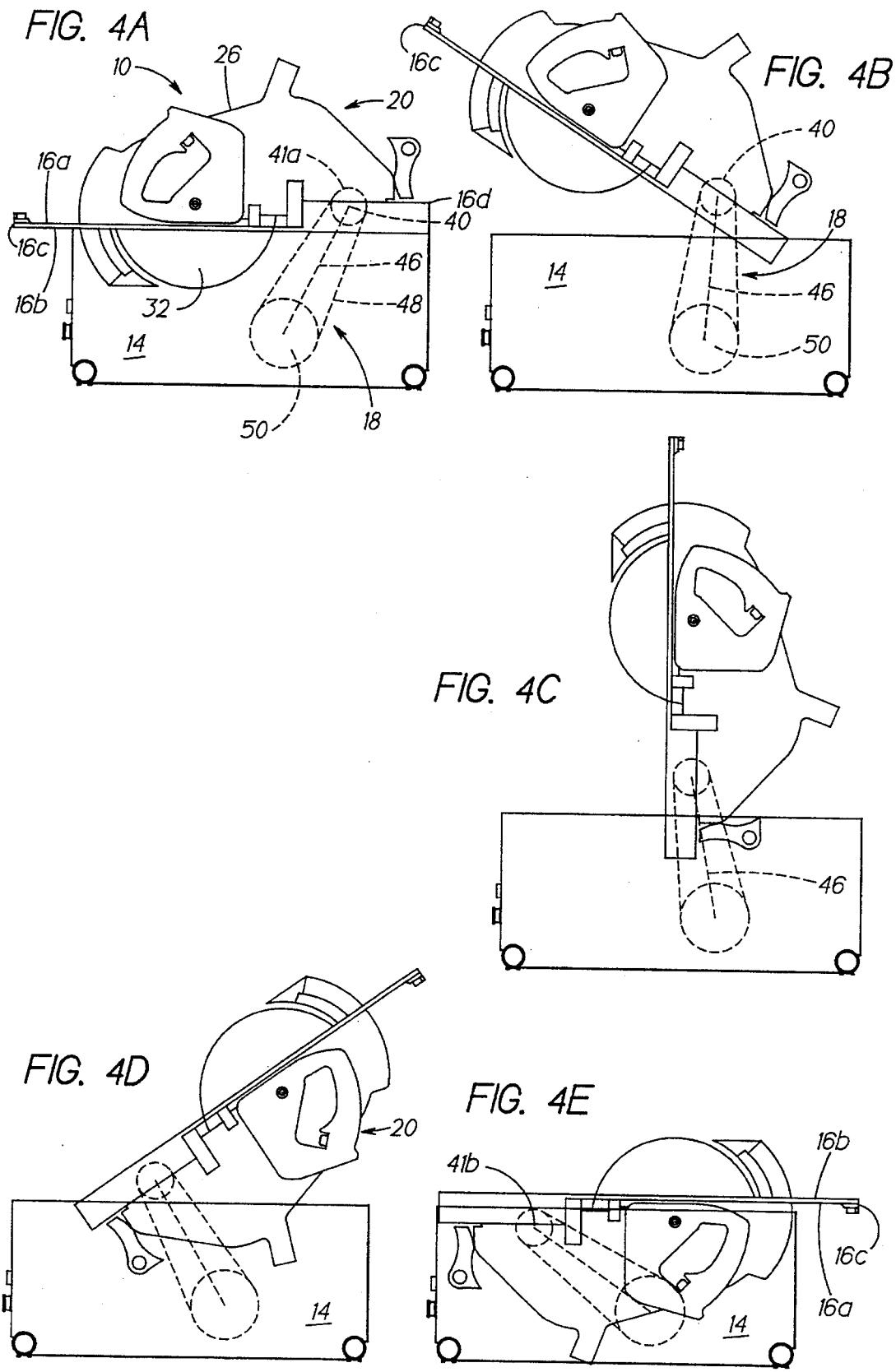

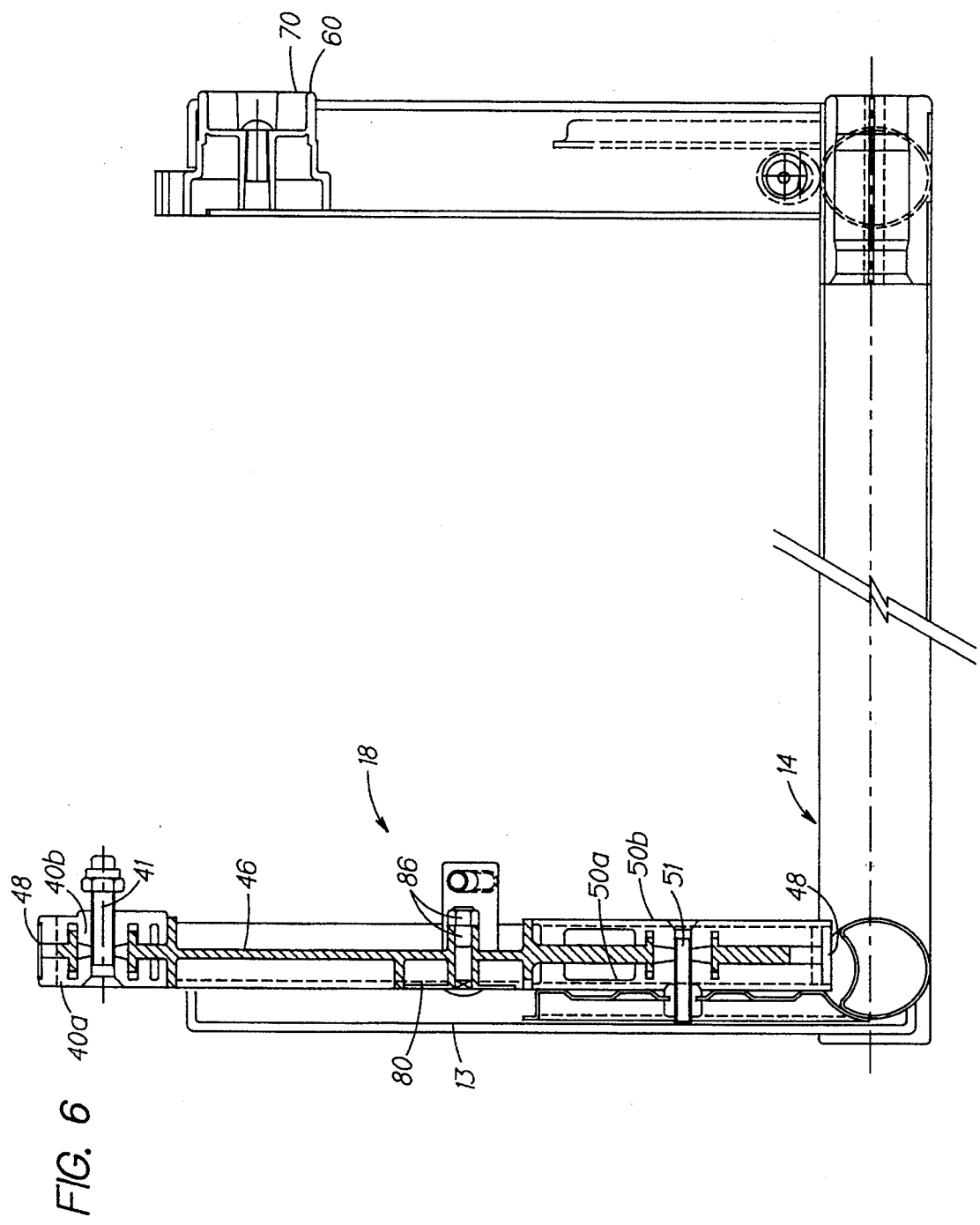

PIVOTING TABLE WITH POWER TOOL

This application is a continuation of continuation application Ser. No. 08/341,852, filed Nov. 18, 1994 now abandoned, which is a continuation of application Ser. No. 08/111,691, filed Aug. 25, 1993 now abandoned.

BACKGROUND OF THE INVENTION

This invention relates to pivoting tables, and particularly to tables having power tools mounted thereon, such as a saw of the type which is mounted on a first side of a table for movement between two dispositions so that in a first disposition, the saw is above the first side of the table and can be manipulated to work on workpieces supported on said first side, and in a second disposition, the saw is below the first side of the table, a blade thereof projecting through a slot in the table to work on workpieces supported on a second side of the table.

Such an arrangement was first described in DE-A-1628992. Here a saw is mounted on a table which is pivoted in a frame and flips over between two modes of operation; a first snip-off mode and a second bench saw mode.

One of the benefits of such an arrangement is its versatility. Not only does it flip between two, quite different, modes of operation, but also it is mounted on a frame and arranged so that it is transportable.

However, a table which is capable of flipping over has numerous other uses, and it is an object of the present invention to provide a table having a novel method of attachment to its frame enabling easy and convenient flip over so that either surfaces of the table can be arranged upper most in the frame.

SUMMARY OF THE INVENTION

In accordance with this invention there is provided a pivoting table comprising a table and a frame, the table being pivoted about a first axis to an intermediate member which is pivoted about a second parallel axis to the frame, means being provided to rotate said table about said first axis when the member is pivoted about said second axis.

Preferably said first axis moves from a position above the level of the table to a position below the level of the table.

The table may have a first wheel fixed thereto around said first axis and said means rotates the wheel when the member pivots about the second axis.

Said means may comprise a belt around said first wheel and around a second wheel fixed around said second axis, so that pivoting of said intermediate member relative to the frame rolls the first wheel inside the belt and rotates the table.

Preferably, the first and second wheels are dimensioned so that, given the extent of the pivot of said intermediate member relative to the frame, the first wheel and table rotate through 180° between two dispositions thereof.

Said first wheel may be mounted on one side of the table, in which case said wheels and intermediate member are arranged so that the two sides of the table are at the same level in the game in the two dispositions of the table.

The table preferably includes catch means to lock the table in either disposition. Preferably the frame has a catch member at both ends of the frame adapted to catch and support the front edge of the table in either of its dispositions.

Needless to say, it is extremely preferable to have two of said pivot systems, one on either side of the table and frame.

Such a table finds particular application in a power tool such as a saw of the type disclosed in DE-A-1628992. Nevertheless, a table which flips over in this manner doubtless has other applications as well which might also benefit frown the arrangement defined above.

BRIEF DESCRIPTION OF THE DRAWINGS

The invention is further described hereinafter, by way of one example only, with reference to the accompanying drawings, in which:

FIG. 2 is a side view (transparent) of the saw of FIG. 1 in a bench mode of operation;

FIG. 3 is a side view, partly cut away, of the saw of FIGS. 1 and 2 in the snip-off position; and, FIG. 4 is a sequence of side views (transparent) showing flip-over from snip-off to bench saw modes.

DETAILED DESCRIPTION OF THE PREFERRED EMBODIMENTS

Figure 1:
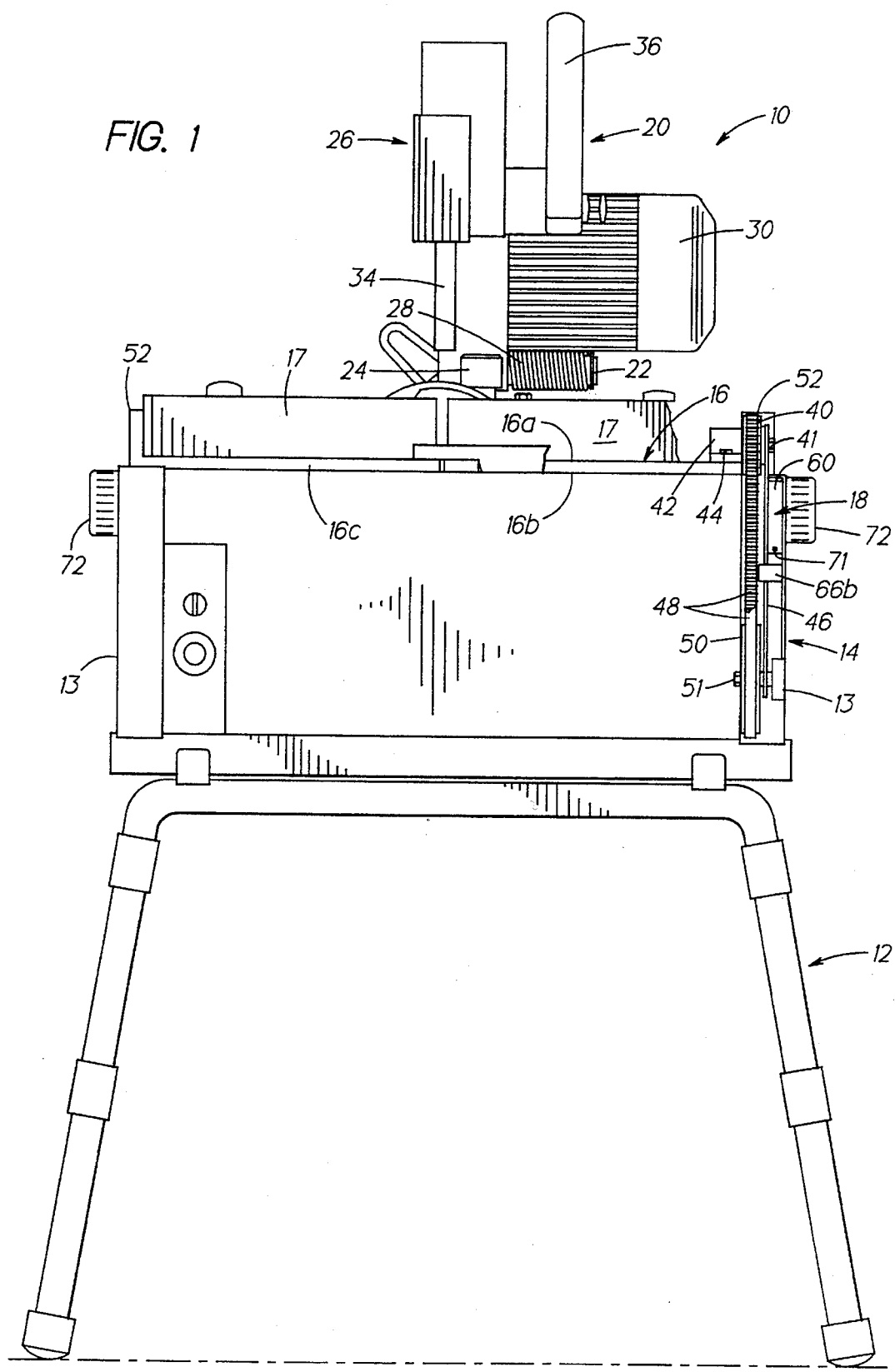
FIG. 1 is a front view of a saw mounted on a table according to the present invention.

In FIG. 1, a power tool 10 is a saw and has legs 12 supporting a frame 14. A table 16 is pivoted with respect to the frame through a pivot system 18 described further below. On the table 16, on a first side 16a thereof, is mounted a saw assembly 20.

The saw assembly 20 comprises a pivot 22 (see also FIG. 3) between a pivot member 24 and a saw housing 26. A spring 28 biases the saw housing 26 to an open position as shown in FIG. 3.

The saw housing 26 includes a motor 30 drivingly connected to a saw blade 32 (see FIG. 2) under a lower guard 34. A handle 36 is operable to pivot the housing 26 up and down about pivot 22 to plunge the blade 32 into workpieces supposed on the side 16a of the table 16. A fence 17 is used to position workpieces. The table 16 has a slot (not visible) into which the blade can be lowered.

When pivoted right down against the table 16, the housing 26 can be locked in position by means not shown. When locked in this position, as shown in drawing A of FIG. 4, the table 16 is ready for pivoting to the bench saw mode shown in FIG. 2. Here, the second side 16b is uppermost and the blade 32 protrudes right through the table 16. This mode is particularly useful for rip cutting of long workpieces moved relative to the blade over, but supported on the table 16.

The pivoting system 18 allowing flip over between the two modes of operation shown in FIGS. 2 and 3 comprises a first toothed wheel 40 which is fixed to the side 16a of the table through a bracket 42 secured to the table by bolts 44 (see FIG. 1). Two such wheels 40 and brackets 42 are provided, at either edge of the table on the side 16a, but only one is shown in the drawings.

A second wheel 50 is fixed in each side 13 of the frame 14. An intermediate member 46 is pivoted about the centre of each wheel 40,50 and serves to tension a belt 48 around the two wheels. A cover 52 extends over the wheels 40,50.

As the member 46 pivots around the axis or axle 51 of the wheel 50, the wheel 40 is forced to roll inside the belt 48. Since the table 16 is rigidly connected to the wheel 40, the table pivots about pivot axis or axle 41, being the axis of the wheel 40 in the member 46. Moreover the axis moves transversely with respect to itself between two positions indicated at 41a and 41b in the drawings.

The dimensions and positions of the wheels 40 and 50, and the length of the member 46, are so arranged that, on pivoting through an angle x (which is sufficient to take the pivot axis or axle 41 as far below (t"), the centre line between sides 16a and 16b of the table as it presently is above (t') that line in FIG. 3, i.e.. t'=t") while at the same time completing half a revolution of the wheel 40 and thus mining the table 16 upside down.

This sequence of moves is shown in FIG. 4. In drawing A, the table has side 16a uppermost and the saw assembly 20 is in the snip-off mode, although the saw housing 26 is locked in its lowered position with the blade 32 protruding through the table. Here axis 41 is in its first position 41a. In drawing B, the front 16c of table 16 has been pulled forwardly and lifted. By virtue of the pivot system 18, the table cannot lift without coming forward and cannot come forward without lifting. In other words, the table is constrained to follow just the single path or sequence of moves illustrated. In drawing C, the table is vertical having been rotated through 90°. The intermediate member 46 has already passed its peak in this position so that no further lifting of the table and assembly is necessary.

In drawing D, the saw assembly 20 is beginning to enter the frame 14 and in drawing E it is inside the frame with the table 16 completely inverted (i.e. with side 16b now uppermost). Here axis 41 has moved completely to its second position 41b. Moreover, the second side 16b of the table is at the same level with respect to the frame 14 as the first side 16a was in the snip-off mode of drawing A. Thus accessories connectable to the frame 14 can be arranged to be useful to both modes of operation of the saw without having to arrange for any change of height of the table.

Mowerover, the axis or axle 41 moves in an arc 41c between its two positions 41a, 41b and from either position the axis or axle 41 first moves upwardly so that the table is always raised against gravity from either disposition.

Referring back to FIG. 3, the rear end 16d of the table 16 is unsupported. A rear knob 60 having a hook 64 is rotatably mounted in the side of the frame 14 on a bolt 62, but it has no function in this position of the saw. However, a stop block 66a is fixed in the side 13 of the frame 14. The intermediate member 46 abuts the block 66a and through the connection of the member 46 to the back of the table 16, supports the table at its rear edge 16d.

Knob 60 is connected to a front knob 70 by a cable 71. Instead of a bolt 62, knob 70 has a handle 72 by means of which it may be turned. Otherwise it is structurally the same as knob 60 and is rotably mounted in the side of the frame 14. It has a hook 74 which catches a catch ledge 76 on the table 16 and which has catch surfaces 76a and b. In the snip-off mode, it is catch 76a which is captured by the hook 74. Rotation of the handle 72 releases hook 74 from the catch. Moreover, the front of the table is supported by the ledge 76 resting on the knob 70. Only one catch is necessary to hold the table 16 down, because the rear edge 16d, for example, cannot rise without the front edge 16c rising. In other words, since the front edge 16c is locked by hook 74, then the whole table is locked as well. In any event, the table is heavy at its rear edge with its burden of the saw assembly 20, and so it is unlikely to lift anyway.

On release of the hooks 74, (there being one on each side of the frame) the table can pivot as described above with reference to FIG. 4. However, when the table again comes to rest in its inverted disposition on the knobs 60,70, it is hook 64 of the knob 60 which engages catch surface 76b of catch 76. Moreover, it rests on knob 60 and so supports the front (now rear) edge 16c of the table. Again, the rear edge 16d (now at the front) is unsupported except that a second stop block 66b is formed in the side 13 of the frame 14 and against which the member 46 abuts in the bench mode position. Again, no catch is required here because end 16d of the table cannot lift in the bench mode position without edge 16c lifting simultaneously, and again to a much greater extent. Moreover, the weight of the saw housing holds that end down. Preferably both knobs 60,70 are spring biased in an anti-clockwise direction (looking at FIG. 3) although only knob 60 absolutely requires it given the cable 71 arrangement shown.

One of the major benefits of this arrangement is that the table 16 is constrained to a single freedom of movement, despite the somewhat complicated nature of that movement. But, as a consequence of this constraint, there is little risk of the arrangement jamming as it might if, for example, the crudest form of the present invention as defined above was employed. In that case it would be essential for the operator to ensure that the table remained square to the frame, or that he pivoted the table at the right moment in relation to the transverse movement of the pivot axis. However, with the present arrangement no such care is required. Pulling the table forward has the effect of commencing pivoting of the table, and vice versa. Thus while cruder forms of the present invention are feasible, the arrangement described with reference to the drawings is preferred.

Figure 5:
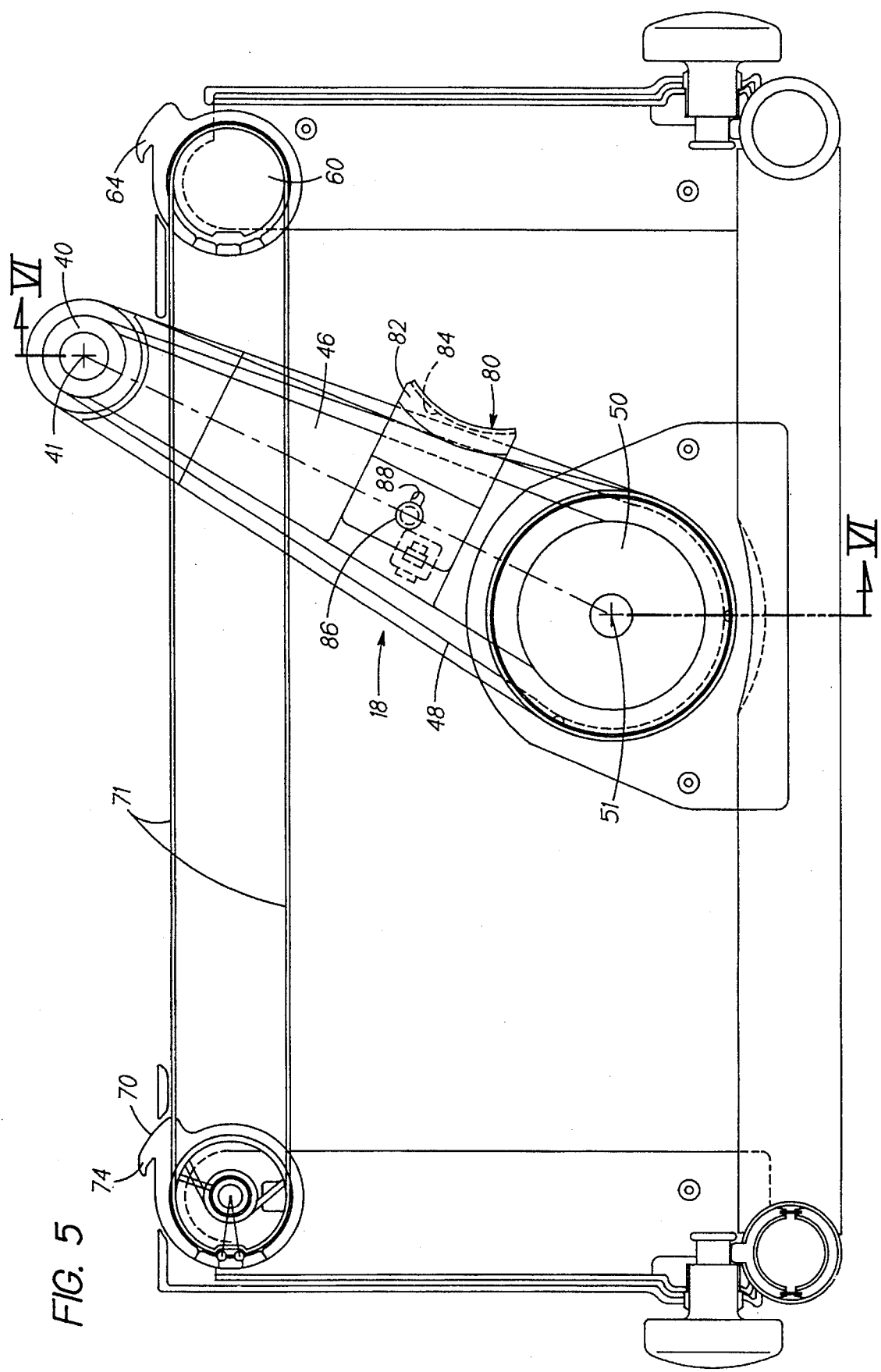
FIG. 5 is a side view of the frame of a preferred embodiment of the present invention; and, FIG. 6 is a front view, partly in section along the line VI—VI in FIG. 5 of the embodiment shown in FIG. 5.

Finally, although FIGS. 1 and 3 show the intermediate member 46 to one side of the wheels 40,50 an alternative arrangement is shown in FIGS. 5 and 6. Here, the wheels 40,50 are each constructed from two half-shells 40a,b and 50a,b, with the member 46 disposed between the half-shells. This has the effect of reducing bending loads on the member 46, because it is supported by the wheels, at least at its most vulnerable areas near its pivots or axle 41,51 to the wheels 40,50 respectively.

FIG. 5 also shows an adjustment mechanism 80 to tension the belt 48 which comprises a tensioner 82 having a curved surface 84 pressing the belt 48 and being connected to the member 46 by bolt and nut 86. The bolt passes through an eye 88 of the tensioner enabling its adjustment.

I claim:

1. A pivoting table comprising:

a first planar side;

a second planar side parallel to said first planar side;

wherein either said first or second side may occupy an upper-most position;

a distinct front side;

a distinct rear side located opposite to said front side;

a frame for supporting said table;

a first wheel rigidly connected to said table about a first pivot axis;

a second wheel attached to said frame about a second pivot axis;

an intermediate member connected to the center of said first wheel and pivotally connected to said second wheel;

a belt connecting said first wheel to said second wheel for effecting cooperative rotational movement of both said first and said second wheels; and such that when said table is rotated about said first pivot axis the first pivot axis moves from a position above the table to a position below the table.

2. A pivoting table as claimed in claim 1, wherein said first and second wheels are sized so that said first wheel and said table both rotate through 180-degrees and cause said first and second planar sides to reverse positions.

3. A pivoting table as claimed in claim 2, wherein said table occupies a constant height above ground regardless of which of said planar sides is in the upper-most position.

4. A table as claimed in claim 3, further comprising locking means to lock said table in position either before or after rotation.

5. A table as claimed in claim 4, wherein said locking means comprises two catches located on said frame that lock said front end of said table regardless of which of said planar sides occupies the upper-most position.

6. A pivoting table comprising:

a table top with two substantially flat horizontal sides;

wherein one of said sides is in an upper-most position and the other side is in a lower position;

said table top having a distinct front and rear ends;

a frame for supporting said table top on one of said substantially flat sides;

a first wheel rigidly connected to said table top and mounted about a first pivot axis;

a second wheel connected to said frame and mounted about a second pivot axis;

an intermediate member connected to the center of said first wheel and pivotally connected to said second wheel;

a belt operatively associated with both said first and said second wheels, and which translates rotational movement between said first and second wheels;

such that pivoting of said intermediate member about said second axis causes said first axis to move transversely and further causes said first wheel to simultaneously roll inside said belt; and wherein simultaneous rolling of said first wheel and transverse movement of said first axis effects a 180-degree rotation of said substantially flat horizontal sides of said table top through the rigid connection of said first wheel with said table top, such that the flat side previously in the upper-most position is now in the lower position.

7. A pivoting table as claimed in claim 6, wherein said intermediate member's pivot about said second axis causes said first axis to travel transversely from a position above the table to position below the table or from a position below the table to one above the table depending on which side of the table is initially in the upper-most position.

8. A pivoting table as claimed in claim 6, wherein said table top occupies a constant level above ground regardless of which of said sides is in the upper-most position.

9. A table as claimed in claim 6, further comprising locking means to lock said table top in position either before or after rotation.

10. A table as claimed in claim 9, wherein said locking means comprises at least one catch located on said frame that locks said front end of said table top regardless of which of said substantially horizontal sides occupies the upper-most position.

11. A pivoting table for supporting a power tool comprising:

a table top with two substantially flat horizontal sides;

wherein one of said sides is in an upper-most position and the other side is in a lower position;

said table top having a distinct front end and a distinct rear end;

a frame for supporting said table top on one of said substantially flat sides at a height above ground;

a first wheel rigidly connected to said table top and mounted about a first pivot axis;

a second wheel connected to said frame and mounted about said second axis;

an intermediate member connected to the center of said first wheel and pivotally connected to the center of said second wheel;

a drive means which translates rotational movement between said first and second wheels;

a locking means to lock said table in position; and such that pivoting of said intermediate member about said second axis causes said first axis to move transversely and further causes said first wheel to simultaneously roll, thus effecting a 180-degree rotation of said substantially flat horizontal sides of said table top through the rigid connection of said first wheel with said table top, such that the side previously in the upper-most position is now in the lower position and the upper-most position is at the same height.

12. A pivoting table for supporting a power tool as claimed in claim 11, wherein said drive means is a belt attached to said first and second wheels to effect rotation of said wheels.

* * * * *